(12) United States Patent
Hidaka et al.

(10) Patent No.: US 10,201,060 B2
(45) Date of Patent: Feb. 5, 2019

(54) COMMUNICATION ADDRESS SETTING METHOD, OPERATION TERMINAL, AND LIGHTING SYSTEM

(71) Applicant: Panasonic Intellectual Property Management Co., Ltd., Osaka (JP)

(72) Inventors: Yuto Hidaka, Osaka (JP); Hiroshi Sugawara, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/617,956

(22) Filed: Jun. 8, 2017

(65) Prior Publication Data

US 2017/0359884 A1    Dec. 14, 2017

(30) Foreign Application Priority Data

Jun. 10, 2016    (JP) .................................. 2016-116705

(51) Int. Cl.
| | | |
|---|---|---|
| *H05B 37/02* | (2006.01) | |
| *G06F 3/0481* | (2013.01) | |
| *G06F 3/14* | (2006.01) | |
| *H04B 10/116* | (2013.01) | |

(52) U.S. Cl.
CPC ..... *H05B 37/0245* (2013.01); *G06F 3/04817* (2013.01); *G06F 3/14* (2013.01); *H04B 10/116* (2013.01); *H05B 37/0272* (2013.01)

(58) Field of Classification Search
CPC ............ H05B 37/0272; H05B 37/0218; H05B 37/029; H05B 37/0227; H05B 37/0236; H05B 33/0854; G06F 11/0736; G06F 11/0769; G06F 11/0772; G06F 11/321; G06F 11/327; G06F 3/0202
USPC ......... 315/297, 294, 291, 153, 152, 86, 307; 705/14.64, 14.66, 26.62, 26.9, 35, 39
See application file for complete search history.

(56) References Cited

U.S. PATENT DOCUMENTS

| | | | |
|---|---|---|---|
| 9,618,915 B2 * | 4/2017 | Mohan .................... | G05B 15/02 |
| 2011/0057907 A1 * | 3/2011 | Kim ........................ | G06F 3/042 |
| | | | 345/175 |
| 2014/0055040 A1 | 2/2014 | Nishigaki et al. | |
| 2014/0070706 A1 * | 3/2014 | Fushimi ............. | H05B 33/0863 |
| | | | 315/131 |

(Continued)

FOREIGN PATENT DOCUMENTS

| | | |
|---|---|---|
| JP | 2004-265774 A | 9/2004 |
| JP | 2009-238537 A | 10/2009 |

(Continued)

*Primary Examiner* — Wei Chan
(74) *Attorney, Agent, or Firm* — McDermott Will & Emery LLP

(57) ABSTRACT

A communication address setting method for setting, in an operation terminal, communication addresses of a plurality of lighting devices. The communication address setting method includes: displaying a plurality of icons in a set order, on a screen of the operation terminal, the plurality of icons corresponding to a positional relationship of the plurality of lighting devices; and obtaining a communication address from each of the plurality of lighting devices, associating the plurality of icons in the set order with the communication addresses in an order of the obtaining, and displaying a state of the associating on the screen.

7 Claims, 19 Drawing Sheets

(56) References Cited

U.S. PATENT DOCUMENTS

| | | | |
|---|---|---|---|
| 2014/0070707 A1* | 3/2014 | Nagazoe | H04B 10/116 315/151 |
| 2014/0091731 A1* | 4/2014 | Fushimi | H05B 37/0245 315/292 |
| 2014/0132180 A1* | 5/2014 | Ukai | H05B 33/0863 315/292 |
| 2014/0222213 A1* | 8/2014 | Mohan | G05B 15/02 700/275 |
| 2014/0331153 A1* | 11/2014 | Park | G06F 3/0488 715/763 |
| 2016/0381767 A1* | 12/2016 | Tiberi | G06F 3/04817 715/736 |
| 2017/0156195 A1* | 6/2017 | Shepherd | H05B 35/00 |

FOREIGN PATENT DOCUMENTS

| | | |
|---|---|---|
| JP | 2011-076875 A | 4/2011 |
| JP | 2014-060136 A | 4/2014 |
| JP | 2014-072083 A | 4/2014 |

\* cited by examiner

FIG. 7B

| PROCESS | OPERATION OR STATE |
|---|---|
| (S1) | ARRANGE ICONS TEMPORARILY |
| (S2) | PRESS BUTTON OF ORDER SETTINGS TO PUT LIGHTING SYSTEM IN ORDER SETTINGS MODE |
| (S3) | DETERMINE ORDER FOR ASSOCIATING ICONS WITH COMMUNICATION ADDRESSES |
| (S4) | DISPLAY ICON NAMES IN LIST ACCORDING TO ORDER OF TOUCHING ICONS IN (S3) |
| (S5) | PRESS BUTTON OF START AUTOMATIC ASSOCIATION TO PUT LIGHTING SYSTEM IN ASSOCIATING MODE OPERATION TERMINAL TRANSMITS COMMAND FOR STARTING ASSOCIATION TO MANAGEMENT DEVICE |
| (S6) | MANAGEMENT DEVICE TRANSMITS COMMAND FOR STARTING ADDRESS TRANSMISSION TO LIGHTING DEVICES |
| (S7) | LIGHTING DEVICES PERFORM BLINKING TO INDICATE OWN COMMUNICATION ADDRESSES BY VISIBLE LIGHT COMMUNICATION |
| (S8) | SETTING OPERATOR MOVES WITH OPERATION TERMINAL TO POSITION DIRECTLY UNDER LIGHTING DEVICE |
| (S9) | OPERATION TERMINAL IN AUTOMATIC ASSOCIATING MODE RECEIVES BY LIGHT RECEIVER OPTICAL ID (ADRESS) OF LIGHTING DEVICE |
| (S10) | ASSOCIATE AUTOMATICALLY ICON NAME WHICH IS FIRST IN ORDER DETERMINED IN (S3) WITH RECEIVED COMMUNICATION ADDRESS |
| (S11) | PERFORM PROCESSES OF (S8) AND (S9) AS MANY TIMES AS THE NUMBER OF LIGHTING DEVICES TO ASSOCIATE ICON NAMES WITH COMMUNICATION ADDRESSES, AND DISPLAY COMMUNICATION ADDRESSES AND BUTTON OF CANCEL ON LIST |
| (S12) | WHEN BUTTON OF CONFIRM ADDRESS IS PRESSED, OPERATION TERMINAL TRANSMITS MINIMUM LIGHTING COMMAND TO MANAGEMENT DEVICE, AND MANAGEMENT DEVICE CAUSES LIGHTING DEVICES TO EMIT LIGHT AT MINIMUM LIGHTING LEVEL |
| (S13) | OPERATION TERMINAL TRANSMITS 100% LIGHTING COMMAND IN ORDER BY SPECIFYING ADDRESSES IN ORDER OF ASSOCIATION (LISTED ORDER) |
| (S14) | SETTING OPERATOR CONFIRMS THAT ICONS AND COMMUNICATION ADDRESSES ARE CORRECTLY ASSOCIATED |
| (S15) | PRESS BUTTON OF END SETTINGS TO END SETTINGS OF ICONS AND COMMUNICATION ADDRESSES |

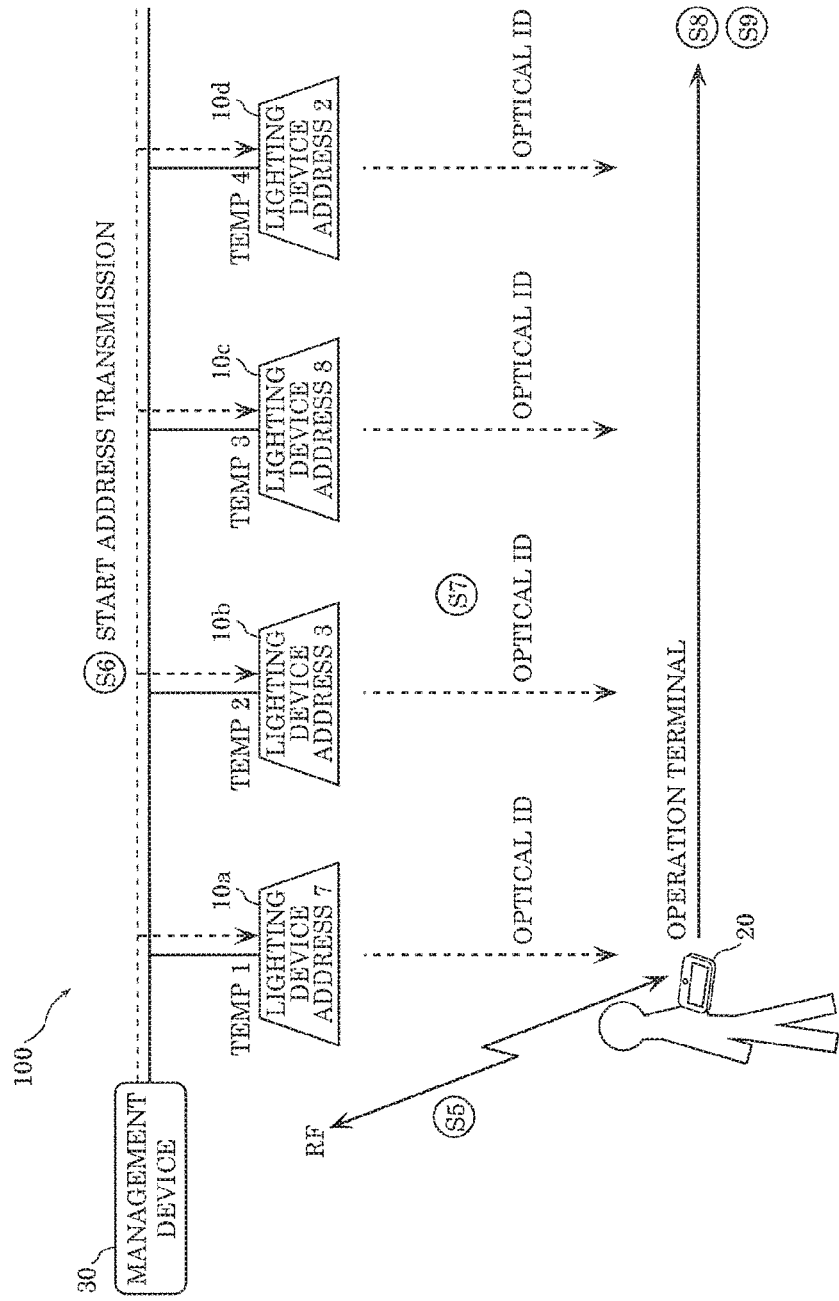

FIG. 9B

| PROCESS | OPERATION OR STATE |
|---|---|
| S10A | WHEN TWO OR MORE COMMUNICATION ADDRESSES ARE RECEIVED IN PREDETERMINED PERIOD OF TIME BY OPERATION TERMINAL, DISPLAY COMMUNICATION ADDRESSES IN CORRECTION INPUT SECTION AND STOP AUTOMATIC ASSOCIATION |
| S11A | WHEN SETTING OPERATOR TAPS ICON OF COMMUNICATION ADDRESS, OPERATION TERMINAL TRANSMITS BLINK SIGNAL HAVING COMMUNICATION ADDRESS TO MANAGEMENT DEVICE, TO CAUSE LIGHTING DEVICE TO BLINK |
| S12A | SETTING OPERATOR CHECKS POSITION OF LIGHTING DEVICE WHICH IS CAUSED TO BLINK, AND DRAGS COMMUNICATION ADDRESS, TO PERFORM ASSOCIATION WITH ICON IN MAP SECTION |
| S13A | REPEATEDLY PERFORM PROCESSES OF S11A AND S12A, TO COMPLETE ASSOCIATING OF RECEIVED COMMUNICATION ADDRESSES WITH ICONS |
| S14A | PRESS BUTTON OF RESTART AUTOMATIC ASSOCIATION, TO RESTART AUTOMATIC ASSOCIATION AND PERFORM S8 |

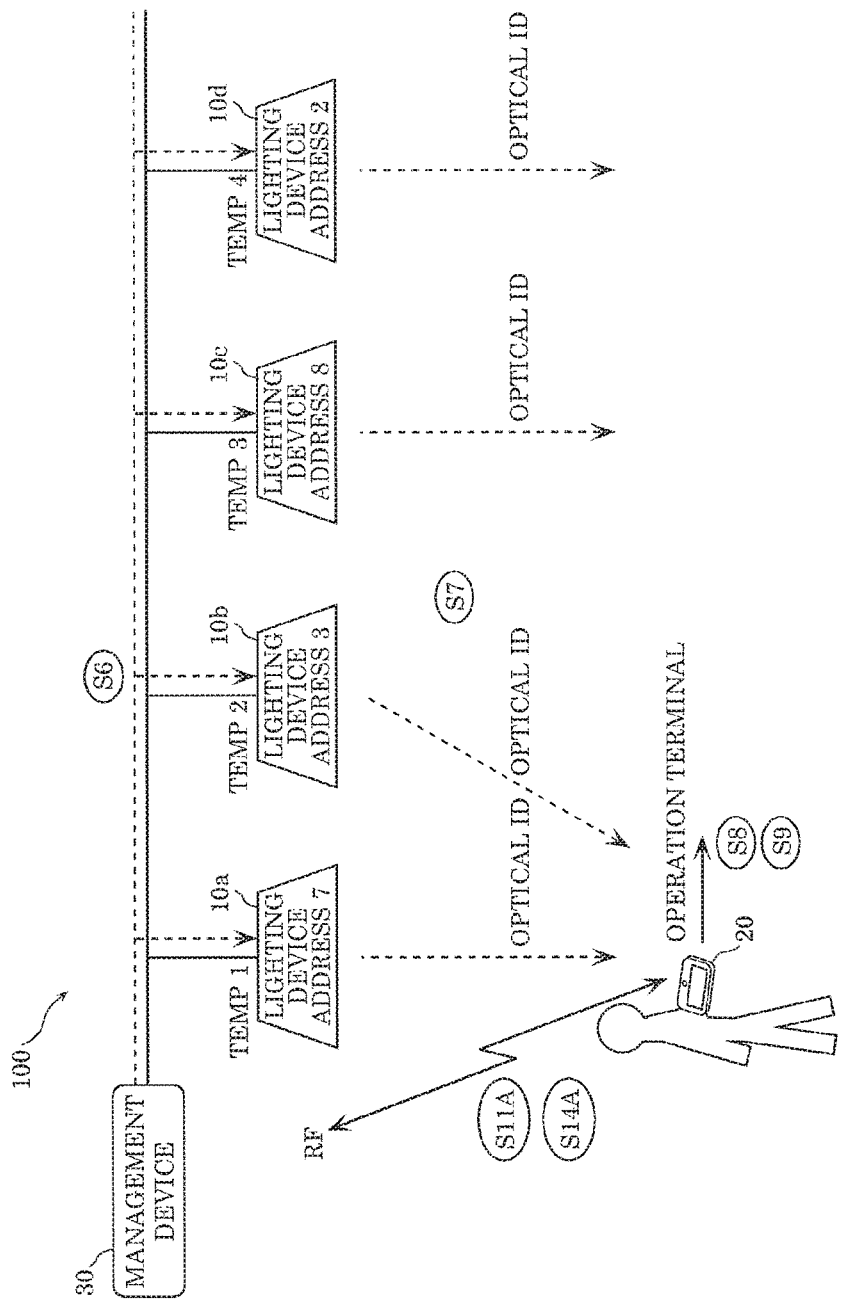

FIG. 11B

| PROCESS | OPERATION OR STATE |
|---|---|
| (S15B) | WHEN ASSOCIATED COMMUNICATION ADDRESS IS INCORRECT, PRESS BUTTON OF "CANCEL" OF CORRESPONDING DEVICE |
| (S16B) | ASSOCIATION FOR CANCELED COMMUNICATION ADDRESS IS DISSOLVED, AND CANCELED COMMUNICATION ADDRESS IS DISPLAYED IN CORRECTION INPUT SECTION |
| (S17B) | WHEN SETTING OPERATOR TAPS ICON OF COMMUNICATION ADDRESS, OPERATION TERMINAL TRANSMITS BLINK SIGNAL HAVING COMMUNICATION ADDRESS TO MANAGEMENT DEVICE, TO CAUSE LIGHTING DEVICE TO BLINK |
| (S18B) | SETTING OPERATOR CHECKS POSITION OF LIGHTING DEVICE WHICH IS CAUSED TO BLINK, AND DRAGS ICON OF COMMUNICATION ADDRESS, TO PERFORM ASSOCIATION WITH ICON IN MAP SECTION |
| (S19B) | REPEATEDLY PERFORM PROCESSES OF (S17B) AND (S18B), TO COMPLETE ASSOCIATING OF RECEIVED COMMUNICATION ADDRESSES WITH ICONS |
| (S20B) | PRESS BUTTON OF END SETTINGS, TO END SETTINGS OF ICONS AND COMMUNICATION ADDRESSES |

COMMUNICATION ADDRESS SETTING METHOD, OPERATION TERMINAL, AND LIGHTING SYSTEM

CROSS REFERENCE TO RELATED APPLICATION

This application claims the benefit of priority of Japanese Patent Application Number 2016-116705 filed on Jun. 10, 2016, the entire content of which is hereby incorporated by reference.

BACKGROUND

1. Technical Field

The present disclosure relates to a communication address setting method for setting communication addresses of a plurality of lighting devices, an operation terminal, and a lighting system.

2. Description of the Related Art

A lighting system which includes a plurality of lighting devices and a management device that controls lighting of the plurality of lighting devices is conventionally known (see Japanese Unexamined Patent Application Publication No. 2011-76875). In this lighting system, a communication address is set for each of the plurality of lighting devices to control lighting of the plurality of lighting devices through communication.

SUMMARY

Immediately after a plurality of lighting devices are installed on a construction material (ceiling, for example) of a building, the relationship between installation positions of the lighting devices and communication addresses of the lighting devices is unknown, and thus it is not possible to control lighting of each of the lighting devices. For that reason, it is necessary to set a communication address of each of the lighting devices in a lighting system, and conventionally there are instances where a huge amount of effort is required in setting of the communication address of each of the lighting devices.

In view of the above, the present disclosure provides a communication address setting method and the like which allow easily setting the communication addresses of a plurality of lighting devices.

An aspect of a communication address setting method according to the present disclosure is a communication address setting method for setting, in an operation terminal, communication addresses of a plurality of lighting devices. The communication address setting method includes: displaying a plurality of icons in a set order, on a screen of the operation terminal, the plurality of icons corresponding to a positional relationship of the plurality of lighting devices; and obtaining a communication address from each of the plurality of lighting devices, associating the plurality of icons in the set order with the communication addresses in an order of the obtaining, and displaying a state of the associating on the screen.

An aspect of an operation terminal according to the present disclosure is an operation terminal which sets communication addresses of a plurality of lighting devices. The operation terminal includes: a display input portion which displays a plurality of icons corresponding to a positional relationship of the plurality of lighting devices; and a controller which causes the display input portion to display the communication addresses of the plurality of lighting devices. In the operation terminal, the controller causes the display input portion to display the plurality of icons in a set order, obtains the communication addresses respectively from the plurality of lighting devices in the set order, associates the plurality of icons and the communication addresses in an order of the obtaining, and causes the display input portion to display a state of the associating.

An aspect of a lighting system according to the present disclosure is a lighting system including a plurality of lighting devices, a management device which controls activation of the plurality of lighting devices, and an operation terminal which communicates with the management device. In the lighting system, the plurality of lighting devices respectively include light sources which transmit optical identifiers (IDs) including respective communication addresses, the operation terminal includes: a display input portion which displays a plurality of icons corresponding to a positional relationship of the plurality of lighting devices; a light receiver which receives the optical IDs; and a controller which causes the display input portion to display the communication addresses included in the optical IDs received by the light receiver, a set order of the plurality of icons are input and displayed in the display input portion, the light receiver receives the optical IDs respectively from the plurality of lighting devices in the set order, and the controller obtains the communication addresses from the respective optical IDs received by the light receiver, associates the plurality of icons with the communication addresses in an order of the obtaining and displays the plurality of icons and the communication addresses in the display input portion, and transmits information of the associating to the management device.

It is possible to easily set the communication addresses of the plurality of lighting devices.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 7B is a process sheet for setting the communication addresses of the plurality of lighting devices in the lighting system according to Embodiment 1;

FIG. 8B is a diagram which illustrates the lighting system during setting the communication addresses, following FIG. 8A;

FIG. 9B is a process sheet for correcting redundancy of communication addresses according to Embodiment 2;

FIG. 10B is a diagram which illustrates a lighting system during correcting the redundancy of communication addresses according to Embodiment 2;

FIG. 11B is a process sheet for correcting an error of a communication address according to Embodiment 3;

DETAILED DESCRIPTION OF THE EMBODIMENTS

A lighting system according to the present embodiment includes a plurality of lighting devices, a management device which controls activation of the plurality of lighting devices, and an operation terminal which communicates with the management device.

Immediately after a lighting device is installed on a construction material (ceiling, for example) of a building, the relationship between an installation position of the lighting device and a communication address of the lighting device is unknown in many cases. It is necessary to know a communication address of each of the lighting devices, in order to control lighting of each of the lighting devices through communication. In view of the above, after the lighting devices are installed in a building, an operation of associating an installation position and a communication address of each of the lighting devices; that is, setting of a communication address, is carried out.

Figure 1:
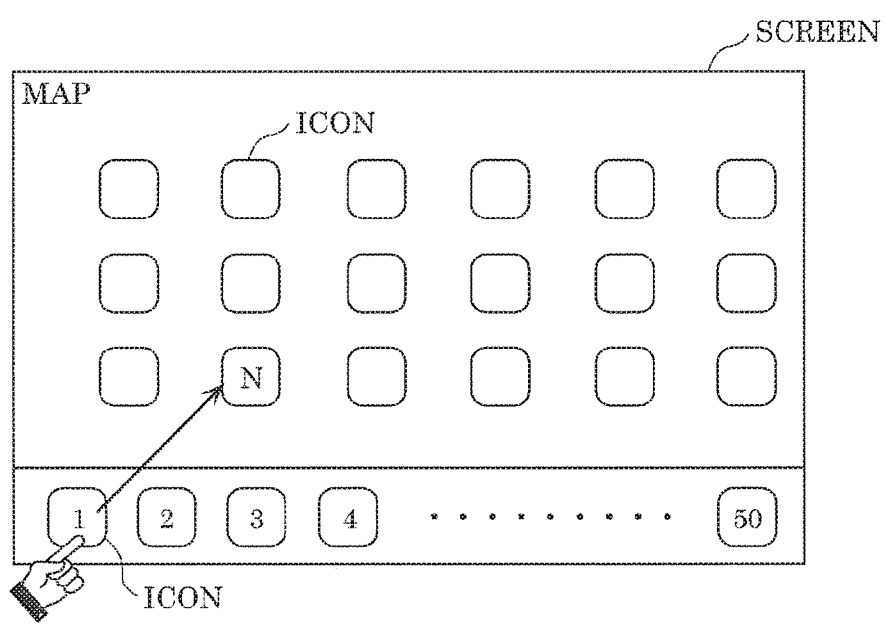
FIG. 1 is a diagram which illustrates a screen of an operation terminal according to a comparison example.

FIG. 1 is a diagram which illustrates a screen of an operation terminal (tablet terminal) according to a comparison example.

A setting operator who sets a communication address can know the relationship between a position of a lighting device and a communication address by, as illustrated in FIG. 1, for example, selecting communication address (1) displayed on a screen with use of an operation terminal, to cause a lighting device corresponding the selected communication address to be brightened and darkened (blink). Then, the setting operator can associate the installation position of the lighting device and the communication address by dragging and dropping icon (1) of the select communication address onto icon (N) on the screen which corresponds to the lighting device that has been caused to be brightened and darkened.

However, since some lighting devices are distantly positioned when a large number of lighting devices (for example, 50 or more) are installed in a building, it is difficult for the setting operator to immediately know a position in the building at which the lighting device corresponding to the select address is located. There are instances where it is necessary to repeatedly go back and forth between one end and the other end of the building for checking which one of the lighting devices is caused to be brightened and darkened, imposing a huge amount of effort on the setting operator.

In view of the above, in the present embodiment, a communication address setting method, an operation terminal, and a lighting system which allow easily setting the communication addresses of a plurality of lighting devices will be described.

The following describes a communication address setting method and the like according to an embodiment, with reference to the drawings. It should to be noted that each of the embodiments described below shows a specific example. Thus, the numerical values, shapes, materials, structural components, the disposition and connection of the structural components, and others described in the following embodiments are mere examples, and do not intend to limit the present disclosure. Furthermore, among the structural components in the following embodiments, components not recited in the independent claims which indicate the broadest concepts of the present disclosure are described as arbitrary structural components.

In addition, each of the diagrams is a schematic diagram and thus is not necessarily strictly illustrated. Furthermore, in each of the diagrams, substantially the same structural components are assigned with the same reference signs, and redundant descriptions will be omitted or simplified.

Embodiment 1

(1.1. Overall Configuration of Lighting System)

Figure 2:
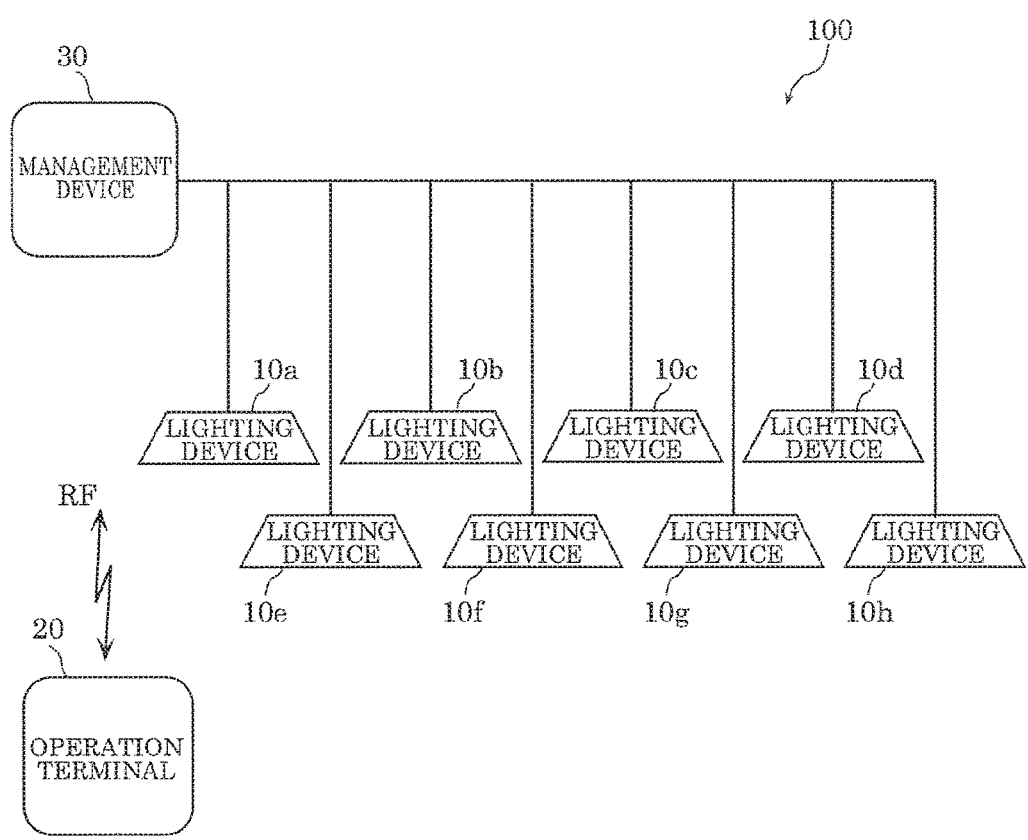
FIG. 2 is a schematic diagram which illustrates a lighting system according to Embodiment 1, and a plurality of lighting devices, a management device, and an operation terminal included in the lighting system.

FIG. 2 is a schematic diagram which illustrates lighting system 100 according to Embodiment 1.

Lighting system 100 includes a plurality of lighting devices 10a, 10b, 10c, 10d, 10e, 10f, 10g, and 10h, operation terminal 20, and management device 30. It should be noted that, although FIG. 2 illustrates eight lighting devices 10a to 10h as an example, there are cases where 50 or more lighting devices are actually installed on a ceiling or the like of a building.

The following describes, with reference to FIG. 2, a communication system of the plurality of lighting devices 10a to 10h, operation terminal 20, and management device 30 which are included in lighting system 100.

Operation terminal 20 and management device 30 can communicate with each other, using radio RF. For the communication system using radio RF, a system such as specified low power radio using a frequency of 920 MHz band or 2.4 GHz band, Wi-Fi (registered trademark), or the like is used. It should be noted that operation terminal 20 and management device 30 may communicate with each other via a connection terminal such as a USB.

Management device 30 and lighting devices 10a to 10h are connected in a wired manner. It should be noted that lighting devices 10a to 10h and management device 30 may wirelessly communicate with each other.

Lighting devices 10a to 10h are capable of not only emitting illumination light, but also performing visible light communication with other devices, using an optical identifier (ID). The visible light communication is carried out between each of lighting devices 10a to 10h and operation terminal 20 when setting communication addresses to lighting devices 10a to 10h. For example, it is possible to transmit a communication address of lighting device 10a to operation terminal 20, by including communication address information of lighting device 10a in an optical ID that is transmitted by lighting device 10a.

The following describes each of operation terminal 20, lighting devices 10a to 10h, and management device 30, which are included in lighting system 100.

(1.2. Operation Terminal)

Operation terminal 20 is, for example, a portable tablet terminal or smartphone, and used as a setting device for setting communication addresses of lighting devices 10a to 10h.

Figure 3:
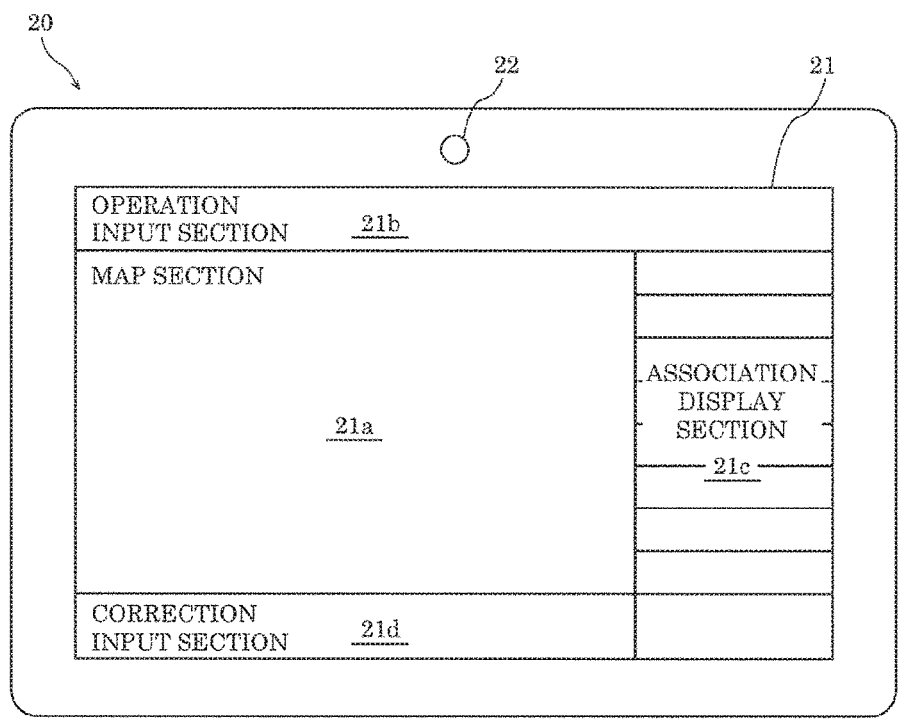
FIG. 3 is a schematic diagram which illustrates an operation terminal according to Embodiment 1.
Figure 4:
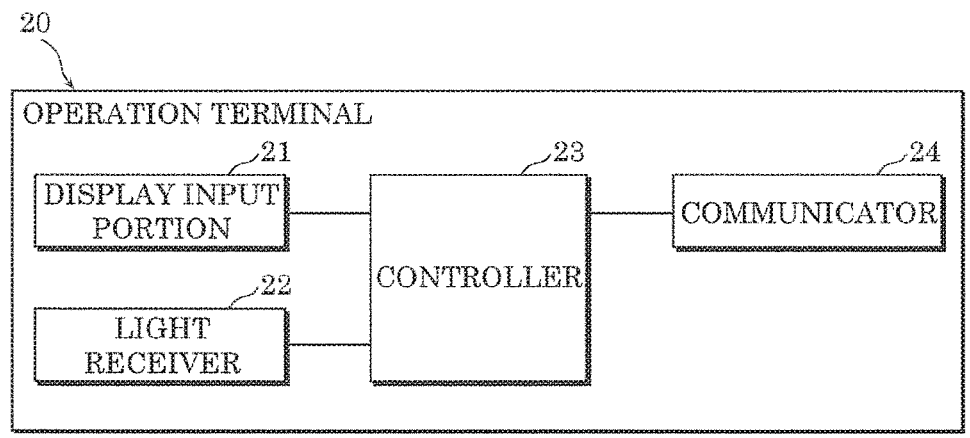
FIG. 4 is a block diagram which illustrates a control configuration of the operation terminal according to Embodiment 1.

FIG. 3 is a schematic diagram which illustrates operation terminal 20. FIG. 4 is a block diagram which illustrates a control configuration of operation terminal 20. Operation terminal 20 includes display input portion (screen) 21, light receiver 22, communicator 24, and controller 23.

Light receiver 22 is, for example, a camera including an imaging device, and receives optical IDs that are transmitted by lighting devices 10a to 10h.

Display input portion 21 is, for example, a touch panel display. It should be noted that, in the following description, display input portion 21 is also referred to as screen 21. Display input portion 21 includes map section 21a, operation input section 21b, association display section 21c, and correction input section 21d.

An icon corresponding to a positional relationship among lighting devices 10a to 10h is displayed in map section 21a. An operation button for setting a communication address is displayed in operation input section 21b. Icon names corresponding to lighting devices 10a to 10h and communication addresses are displayed in association with one another in a list on association display section 21c. Correction input section 21d is a predetermined region used when correcting the association. A setting operator can sequentially execute each of the processes which are necessary for communication address settings and will be described later, by operating the icon or the operation button on display input portion 21.

Controller 23 includes a central processing unit (CPU), a random access memory (RAM), a read only memory (ROM), etc., and controls display input portion 21, light receiver 22, and communicator 24. Controller 23 reads the communication addresses of lighting devices 10a to 10h which are included in the respective optical IDs received by light receiver 22, and stores the communication addresses. In addition, controller 23 transmits a command which has been input using display input portion 21, to management device 30 via communicator 24, or displays a current settings state of the communication addresses on display input portion 21.

Communicator 24 includes an antenna, a radio module, etc. Communicator 24 is capable of communicating with first communicator 32 of management device 30, using radio RF. Controller 23 transmits, to management device 30, information relating to the obtained communication addresses of lighting devices 10a to 10h, using radio RF.

(1.3. Lighting Device)

Lighting devices 10a to 10h are, for example, light emitting diode (LED) illumination devices, and installed on a construction material (ceiling, for example) of a building. Lighting devices 10a to 10h are installed on a ceiling with an interval of approximately 5 meters, for example, such that operation terminal 20 can easily obtain optical IDs separately from lighting devices 10a to 10h.

Figure 5:
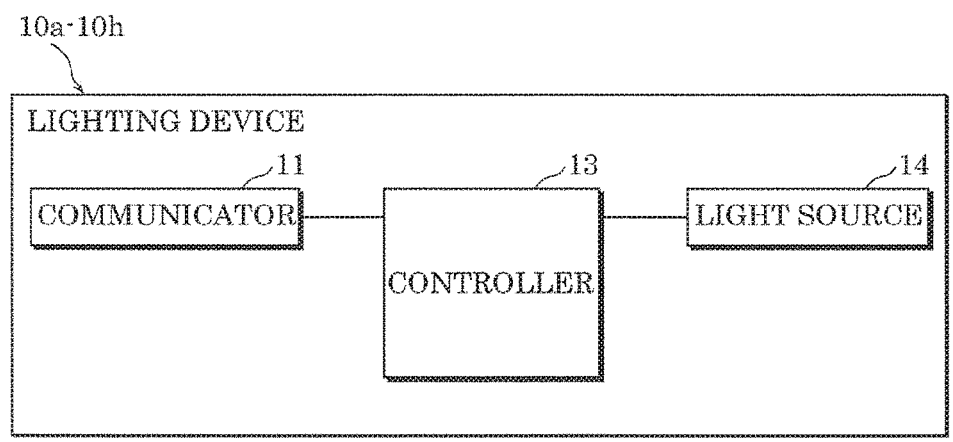
FIG. 5 is a block diagram which illustrates a control configuration of each of the lighting devices according to Embodiment 1.

FIG. 5 is a block diagram which illustrates a control configuration of lighting devices 10a to 10h. Lighting devices 10a to 10h are each include light source 14, controller 13, and communicator 11.

Communicator 11 is connected to second communicator 34 of management device 30 in a wired manner, and transmits, to controller 13, an activation instruction issued by management device 30.

Controller 13 includes a CPU, a RAM, a ROM, etc., and controls lighting of light source 14 on the basis of the activation instruction issued by management device 30. In performing the settings of a communication address, controller 13 receives a predetermined instruction from operation terminal 20 via management device 30, and controls lighting and activation of light source 14. In addition, controller 13 holds a communication address of itself. As a communication address, a unique device Identifier (UDID) is used, for example.

Light source 14 includes a plurality of light emitting diodes which emit white light, red light, green light, or blue light, for example. Light source 14 is subjected to at least one of dimming control and color-adjusting control, by controller 13 which has received an instruction from management device 30. In performing the settings of a communication address, light source 14 is subjected to blinking control which causes light source 14 to transmit an optical ID, and also subjected to control which causes light source 14 to emit light at a minimum lighting level or at a 100% lighting level.

(1.4. Management Device)

Figure 6:
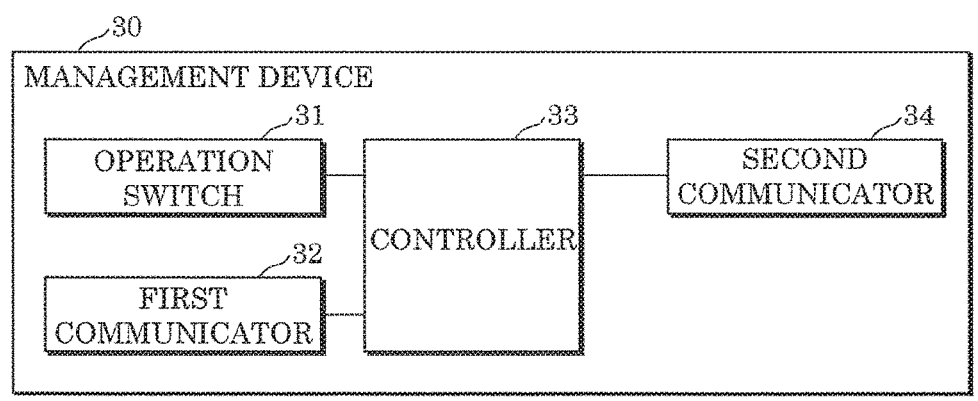
FIG. 6 is a block diagram which illustrates a control configuration of the management device according to Embodiment 1.

Management device 30 is a management server for performing activation control on lighting devices 10a to 10h. FIG. 6 is a block diagram which illustrates a control configuration of management device 30. Management device 30 includes first communicator 32, controller 33, second communicator 34, and operation switch 31.

Controller 33 includes a CPU, a RAM, a ROM, etc., and controls lighting of lighting devices 10a to 10h. In performing the settings of a communication address, controller 33 controls activation of lighting devices 10a to 10h according to an instruction issued by operation terminal 20.

Controller 33 does not have communication address information of each of lighting devices 10a to 10h immediately after lighting devices 10a to 10h are installed in building 50, that is to say, before settings of addresses are carried out. Information indicating installation positions of lighting devices 10a to 10h and communication addresses are transmitted to controller 33 by operation terminal 20 which has obtained the communication addresses, in such a manner that the installation positions and the communication addresses are associated with one another. In this manner, communication address information is stored in management device 30. Management device 30 is capable of controlling lighting of lighting devices 10a to 10h on the basis of the communication address information which has been transmitted.

First communicator 32 is a portion which communicates with communicator 24 of operation terminal 20 using radio RF, and second communicator 34 is a portion which communicates with lighting devices 10a to 10h in a wired manner.

Operation switch 31 is a switch which directly operates lighting devices 10a to 10h, and is connected to controller 33 in a wired or wireless manner. Operation switch 31 is installed outside the body of management device 30, on a wall or the like of a building which is accessible by hand by a user.

(1.5. Communication Address Setting Method)

The following describes in detail a communication address setting method.

Figure 7A:
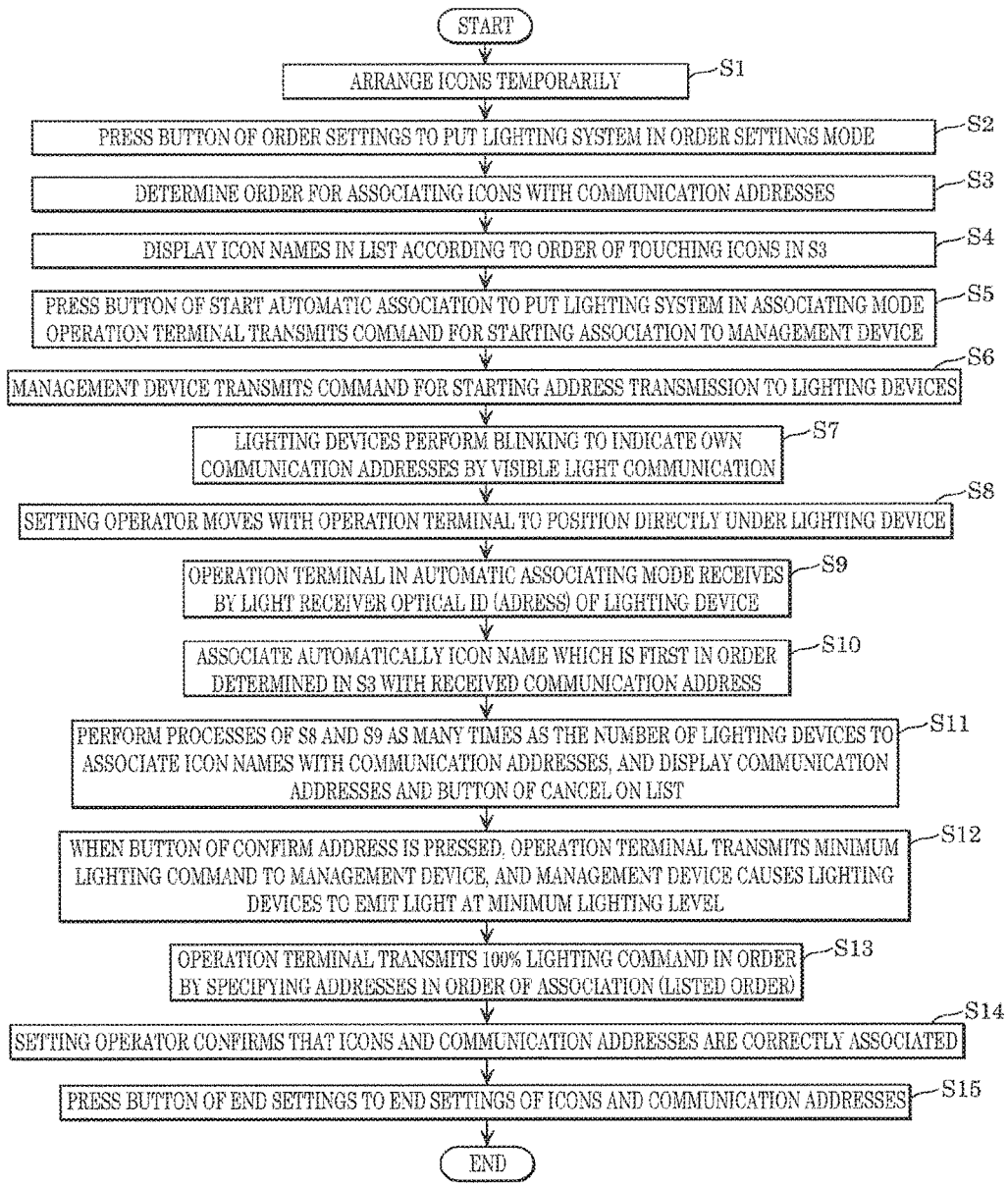
FIG. 7A is a flowchart for setting communication addresses of the plurality of lighting devices in the lighting system according to Embodiment 1.

FIG. 7A is a flowchart for setting communication addresses of a plurality of lighting devices 10a to 10h in lighting system 100. FIG. 7B is a process sheet for setting communication addresses of a plurality of lighting devices 10a to 10h in lighting system 100.

Figure 8A:
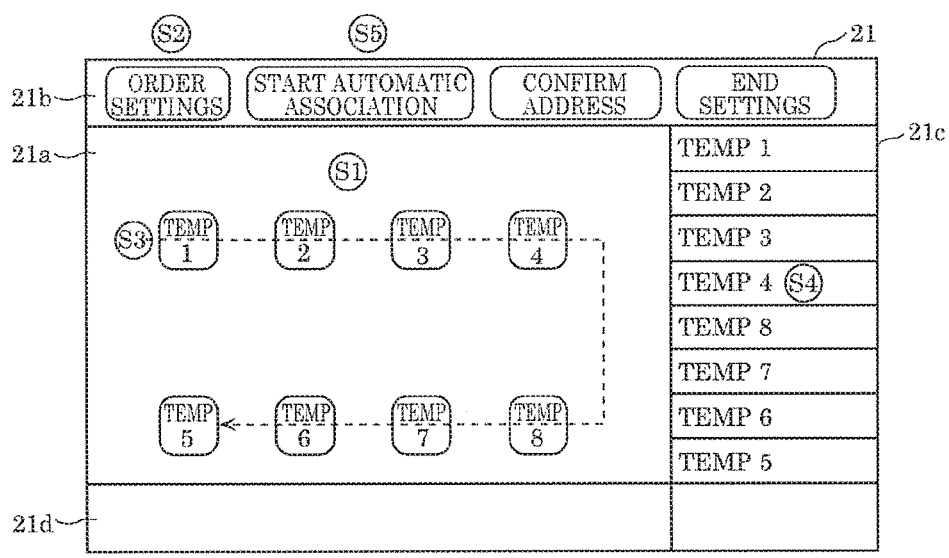
FIG. 8A is a diagram which illustrates a screen of the operation terminal during setting the communication addresses according to Embodiment 1.
Figure 8C:
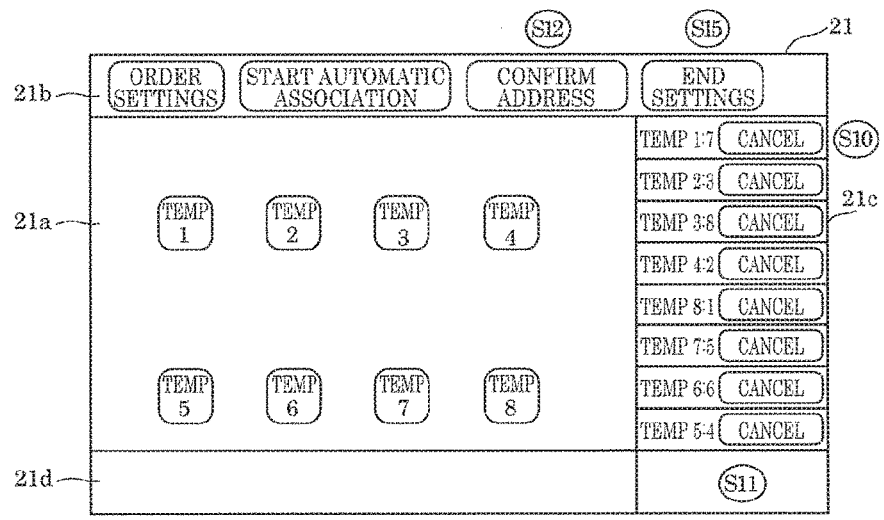
FIG. 8C is a diagram which illustrates the screen of the operation terminal during setting the communication addresses, following FIG. 8B.
Figure 8D:
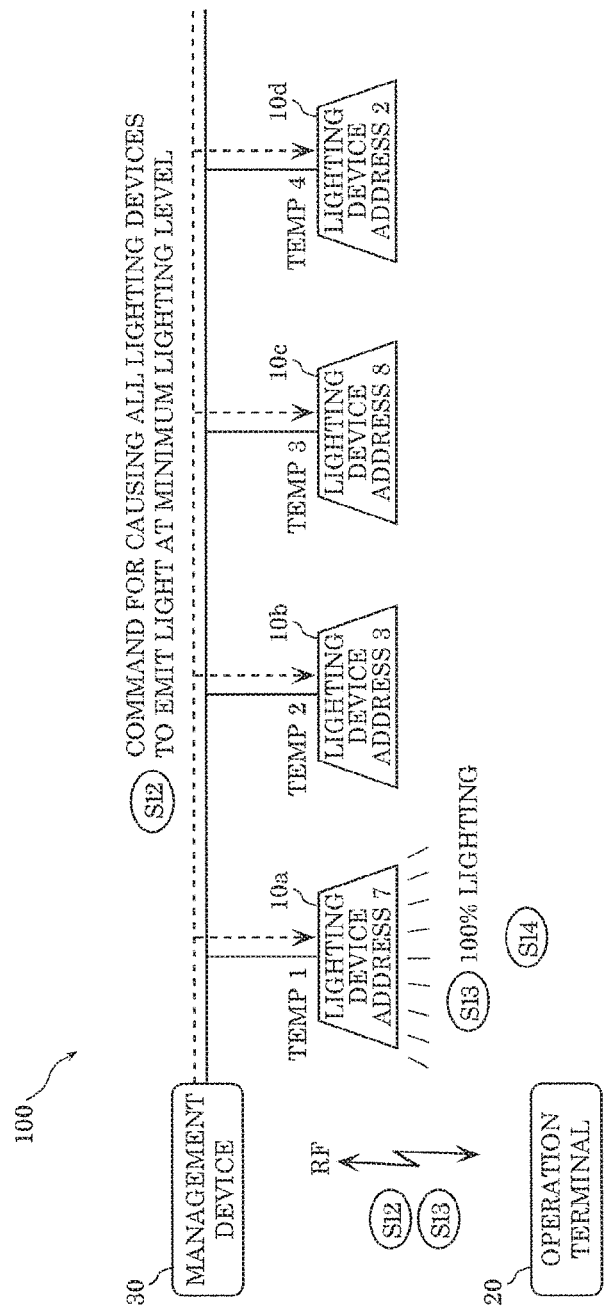
FIG. 8D is a diagram which illustrates the lighting system during setting the communication addresses, following FIG. 8C.
Figure 8E:
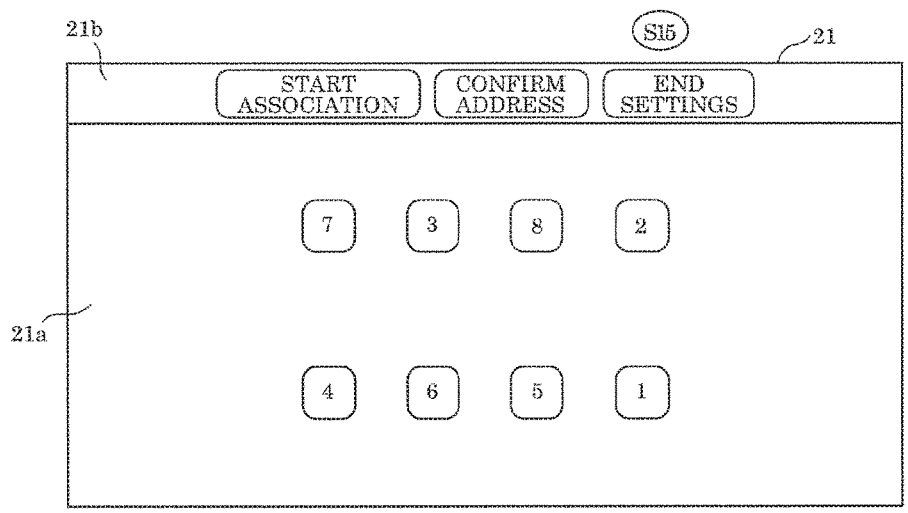
FIG. 8E is a diagram which illustrates the screen of the operation terminal at the time of ending the setting of the communication addresses according to Embodiment 1.

FIG. 8A is a diagram which illustrates screen 21 of operation terminal 20 during setting of communication addresses. FIG. 8B is a diagram which illustrates lighting system 100 during setting of the communication addresses, following FIG. 8A. FIG. 8C is a diagram which illustrates screen 21 of operation terminal 20 during setting of the communication addresses, following FIG. 8B. FIG. 8D is a diagram which illustrates lighting system 100 during setting of the communication addresses, following FIG. 8C. FIG. 8E is a diagram which illustrates screen 21 of operation terminal 20 when ending the setting of the communication addresses.

First, as illustrated in FIG. 8A, a setting operator who performs the setting of a communication address arranges a plurality of icons on screen 21 of operation terminal 20 (S1). The arrangement of the plurality of icons may be performed by reading a map indicating locations of the plurality of lighting device. More specifically, icons (temp 1) to (temp 8) are temporarily arranged on map section 21a in association with the positional relationship among the plurality of lighting devices 10a to 10h. For example, when lighting devices 10a to 10h are installed on a ceiling in a matrix, the icons are arranged on screen 21 so as to correspond to the arrangement of lighting devices 10a to 10h in a matrix. It should be noted that the (temp 1) to (temp 8) of the icons are temporal names used before the communication addresses are set.

Next, the setting operator presses a button of "order settings" displayed in operation input section 21b of screen 21, to put lighting system 100 in an order settings mode (S2).

Next, the setting operator sets an order of the icons (temp 1) to (temp 8). More specifically, an order for associating the icons (temp 1) to (temp 8) with the communication addresses of lighting devices 10a to 10h is determined (S3). For example, the setting operator presses the icons (temp 1) to (temp 8) in a predetermined order, or traces a path of an order for performing the associating on screen 21, thereby setting the order. In FIG. 8A, the operator presses the icons in the order of temp 1, temp 2, temp 3, temp, 4, tamp 8, tamp 7, temp 6 and temp 5. The order for associating the icons may be automatically set by the operation terminal 20.

With this operation, the icon names (temp 1) to (temp 8) are displayed in a list according to the order determined in the process of S3, on association display section 21c of screen 21.

Next, the setting operator presses a button of "start automatic association" displayed in operation input section 21b, to put lighting system 100 in an associating mode (S5) In response to the pressing of the button of "start automatic association", operation terminal 20 transmits a command for starting association to management device 30.

Management device 30 which has received the command for starting association transmits a command for starting address transmission to the plurality of lighting devices 10a to 10h, as illustrated in FIG. 8B (S6).

In this manner, each of lighting devices 10a to 10h starts visible light communication (S7). More specifically, light source 14 of each of lighting devices 10a to 10h blinks and transmits an optical ID including the communication address of the lighting device itself. It should be noted that the blinking of light source 14 is carried out at high speed, and thus it is not possible to visually recognize the contrast.

In this state, the setting operator moves with operation terminal 20 to a position directly under lighting device 10a which is the first lighting device in the order (S8).

In this manner, operation terminal 20 receives an optical ID; that is, a communication address, of lighting device 10a (S9). The optical axis of a camera that is light receiver 22 of operation terminal 20 is, for example, directed to lighting device 10a located directly above operation terminal 20. It should be noted that, although operation terminal 20 is in a state in which an optical ID can be received by the camera that is light receiver 22, a viewing angle of the camera may be narrowed by design so as to avoid receiving an optical ID of lighting device 10b that is disposed adjacently.

Next, as illustrated in FIG. 8C, operation terminal 20 associates the first icon name (temp 1) and the communication address of lighting device 10a which has been received in the process of S9 (S10). More specifically, the first icon name (temp 1) and the communication address which has been received are associated with each other, by being displayed side by side on association display section 21c of screen 21.

Next, the processes of S8 to S10 are performed in the same manner on the rest of lighting devices, 10b to 10h. More specifically, the setting operator moves operation terminal 20, by moving with operation terminal 20 according to the positions of the plurality of lighting devices 10b to 10h in the order determined in the process of S3. In this manner, the rest of icons, (temp 2) to (temp 8), and the communication addresses of lighting devices 10b to 10h are associated with one another in the set order, and displayed in a list on association display section 21c (S11).

Here, the icons and the communication addresses are once associated in a one-to-one relationship. However, the association has not yet been determined at this stage. A button of "cancel" displayed in association display section 21c is a button for correcting the association. When the button of "cancel" is displayed, the association has not yet been determined. How to use the cancel button will be described in Embodiment 3.

Next, in order to determine the association between each of the icons and a corresponding one of the communication addresses, whether or not the association is correct is checked.

First, the setting operator presses a button of "confirm address" displayed in operation input section 21b. By doing so, a minimum lighting command is transmitted by operation terminal 20 to management device 30 to cause lighting devices 10a to 10h to emit light at a minimum lighting level (S12, see FIG. 8D). In response to this command, management device 30 causes all of lighting devices 10a to 10h to emit light at a minimum lighting level. The purpose of causing lighting devices 10a to 10h to emit light at a minimum lighting level is to make it easier to recognize a difference from a lighting device that is caused to emit light at a 100% lighting level. Accordingly, it is not limited to causing lighting devices 10a to 10h to emit light at a minimum lighting level, and lighting devices 10a to 10h may be turned off. It should be noted that transmission of an optical ID is stopped after the process of S12.

Next, operation terminal 20 activates lighting devices 10a to 10h by specifying addresses in an order of obtaining the communication addresses in the processes of S8 to S10 (S13). More specifically, lighting devices 10a to 10h are caused to emit light at a 100% lighting level one by one in the order of obtaining the communication addresses displayed in association display section 21c of screen 21. For example, a lighting device corresponding to the communication address "7" obtained first is caused to emit light at a 100% lighting level. Then, whether or not the lighting device caused to emit light at a 100% lighting level is lighting device 10a disposed at the first position, to confirm that icon (temp 1) corresponding to the installation position of lighting device 10a matches the communication address "7".

In the same manner as above, the rest of lighting devices, 10b to 10h, are caused, one by one, to emit light at a 100% lighting level in the order of obtaining the communication addresses. In this manner, it is determined whether or not the order in which lighting devices 10a to 10h are caused to emit light at a 100% lighting level matches the order determined in the process of S3. When the order in which lighting devices 10a to 10h are caused to emit light at a 100% lighting level and the order determined in the process of S3 match, it is determined that each of the icons and the corresponding one of the communication addresses are correctly associated with each other (S14).

When it is determined that each of the icons and the corresponding one of the communication addresses are correctly associated with each other, a button of "end settings" of operation input section 21b is pressed (S15). With this operation, the communication addresses are determined in a one-to-one relationship with the icons.

The determined communication addresses are displayed on the respective icons on screen 21, as illustrated in FIG. 8E. It should be noted that, although icon names (temp 1) to (temp 8) are deleted in FIG. 8E, icon names (temp 1) to (temp 8) may remain on the icons on screen 21 instead of being deleted. Information relating to each of the determined communication addresses and an arrangement (map) of the icons are collectively transmitted by operation terminal 20 to management device 30.

(1.6. Advantageous Effects, Etc.)

A communication address setting method according to the present embodiment is a communication address setting method for setting (registering), in operation terminal 20, communication addresses of a plurality of lighting devices 10a to 10h. The communication address setting method includes: displaying a plurality of icons in a set order, on screen 21 of operation terminal 20, the plurality of icons corresponding to a positional relationship of the plurality of lighting devices 10a to 10h; and obtaining a communication address from each of the plurality of lighting devices 10a to 10h, associating the plurality of icons in the set order with the communication addresses in an order of the obtaining, and displaying a state of the associating on screen 21.

In this manner, it is possible to easily associate the icons on screen 21 of operation terminal 20 with a plurality of communication addresses. Thus, it is possible to easily set the communication addresses of the plurality of lighting devices 10a to 10h.

For example, the plurality of lighting devices 10a to 10h may be activated in the order of the obtaining of the communication addresses, the communication addresses corresponding one-to-one to the plurality of icons may be determined when receiving an input indicating that an order of the activating of the plurality of lighting devices 10a to 10h matches the set order of the plurality of icons, and the determined communication addresses may be displayed on the plurality of icons in a one-to-one relationship.

In this manner, it is possible to easily set the communication addresses of the plurality of lighting devices 10a to 10h.

For example, the plurality of lighting devices 10a to 10h may transmit optical identifiers (IDs) including the respective communication addresses, and operation terminal 20 may obtain the communication addresses by receiving the optical IDs respectively from the plurality of lighting devices 10a to 10h.

In this manner, it is possible to easily obtain the communication addresses from the plurality of lighting devices 10a to 10h, by receiving the optical IDs.

For example, operation terminal 20 may obtain the communication addresses by being moved according to positions of the plurality of lighting devices 10a to 10h in the set order, and may receive the optical IDs corresponding one-to-one to the plurality of lighting devices 10a to 10h.

In this manner, it is possible to reduce work that is taken when obtaining a communication address, by moving operation terminal 20 in the order to receive the communication address.

For example, the communication addresses of the plurality of lighting devices may be set in management device 30 which controls activation of the plurality of lighting devices 10a to 10h, by transmitting, to management device 30, information in which the plurality of icons and the obtained communication addresses are associated with one another.

In this manner, it is possible to control lighting of the plurality of lighting devices 10a to 10h by management device 30, on the basis of the transmitted communication addresses.

In addition, operation device 20 according to the present embodiment is operation terminal 20 which sets communication addresses of a plurality of lighting devices 10a to 10h. The operation terminal includes: display input portion 21 which displays a plurality of icons corresponding to a positional relationship of the plurality of lighting devices 10a to 10h; and controller 23 which causes display input portion 21 to display the communication addresses of the plurality of lighting devices 10a to 10h, wherein controller 23 causes display input portion 21 to display the plurality of icons in a set order, obtains the communication addresses respectively from the plurality of lighting devices 10a to 10h in the set order, associates the plurality of icons and the communication addresses in an order of the obtaining, and causes display input portion 21 to display a state of the associating.

In this manner, it is possible to easily associate the icons on screen 21 of operation terminal 20 with a plurality of communication addresses. Thus, it is possible to easily set the communication addresses of the plurality of lighting devices 10a to 10h.

For example, when associating of the plurality of icons and the communication addresses fails, an icon indicating a lighting device corresponding to a communication address which cannot be associated may be displayed in a predetermined region.

In addition, lighting system 100 according to the present embodiment is a lighting system including a plurality of lighting devices 10a to 10h, management device 30 which controls activation of the plurality of lighting devices 10a to 10h, and operation terminal 20 which communicates with management device 30. In the lighting system, the plurality of lighting devices 10a to 10h respectively include light sources 14 which transmit optical identifiers (IDs) including respective communication addresses, operation terminal 20 includes: display input portion 21 which displays a plurality of icons corresponding to a positional relationship of the plurality of lighting devices 10a to 10h; light receiver 22 which receives the optical IDs; and controller 23 which causes display input portion 21 to display the communication addresses included in the optical IDs received by light receiver 22, a set order of the plurality of icons are input and displayed in display input portion 21, light receiver 22 receives the optical IDs respectively from the plurality of lighting devices 10a to 10h in the set order, and controller 23 obtains the communication addresses from the respective optical IDs received by light receiver 22, associates the plurality of icons with the communication addresses in an order of the obtaining and displays the plurality of icons and the communication addresses in display input portion 21, and transmits information of the associating to management device. 30

In this manner, it is possible to easily set the communication addresses in lighting system 100, and control lighting of the plurality of lighting devices 10a to 10h on the basis of the communication addresses.

For example, when associating of the plurality of icons and the plurality of communication addresses fails, an icon indicating a lighting device corresponding to a communication address which cannot be associated may be displayed in a predetermined region of display input portion 21 of operation terminal 20.

Embodiment 2

In Embodiment 1, an example in which associating of each of the icons with a corresponding one of the communication addresses proceeds smoothly is described. In Embodiment 2, the case where communication addresses are redundantly obtained is described. Lighting system 100, lighting devices 10a to 10h, operation terminal 20, and management device 30 each has a configuration identical to the configuration according to Embodiment 1.

(2.1. Communication Address Setting Method)

Figure 9A:
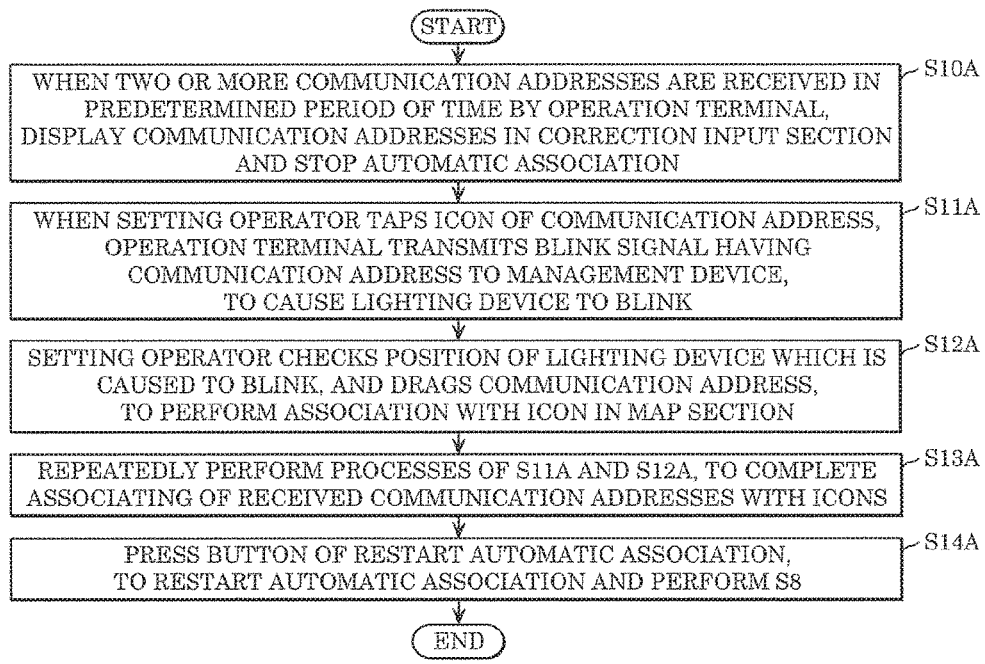
FIG. 9A is a flowchart for correcting redundancy of communication addresses according to Embodiment 2.
Figure 10A:
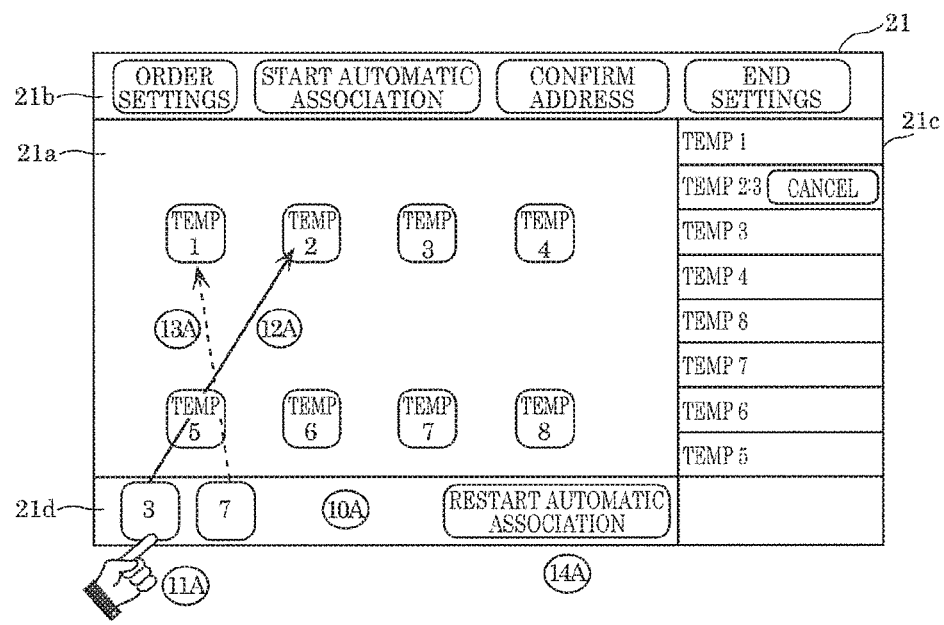
FIG. 10A is a diagram which illustrates a screen of the operation terminal during correcting the redundancy of communication addresses according to Embodiment 2.

FIG. 9A is a flowchart for correcting redundancy of communication addresses. FIG. 9B is a process sheet for correcting redundancy of a communication address. FIG. 10A is a diagram which illustrates screen 21 of operation terminal 20 during correcting redundancy of a communication address. FIG. 10B is a diagram which illustrates lighting system 100 during correcting redundancy of a communication address.

First, a setting operator moves to a position directly under first lighting device 10a (S8), and receives an optical ID from lighting device 10a at this position (S9). According to Embodiment 2, operation terminal 20 receives a plurality of communication addresses at this time.

When a plurality of communication addresses are received at approximately the same time, icons of communication addresses which are redundantly obtained are displayed in correction input section 21d that is a predetermined region of operation terminal 20. Then, lighting system 100 temporarily stops automatic association (S10A). In addition, the setting operator who notices that the icons are displayed in correction input section 21d halts moving with operation terminal 20 (see FIG. 10B).

For example, in the case where a communication address of adjacent lighting device 10b is received at the time of receiving a communication address of first lighting device 10a, the both communication addresses "3" and "7" are displayed in correction input section 21d as illustrated in FIG. 10A.

Redundant receiving of communication addresses is determined by whether or not a plurality of communication addresses are received in a predetermined period of time (for example, two seconds). The predetermined period of time is arbitrarily determined according to installation intervals of lighting devices 10a to 10h and a moving speed of the setting operator. In the case where a plurality of communication addresses are not received in the predetermined period of time, a predetermined icon and an obtained communication address are displayed in association with each other on association display section 21c as in Embodiment 1.

Next, the setting operator taps the icon of one of the communication addresses displayed in correction input section 21d to activate a lighting device having this communication address. For example, communication address "3" illustrated in FIG. 10A is tapped to transmit a blink signal from operation terminal 20 via management device 30 to a lighting device corresponding to communication address "3", thereby causing the lighting device to blink (A11A).

The setting operator is allowed to check which one of the icons on screen 21 corresponds to the lighting device which is caused to blink, according to the installation position of the lighting device which is caused to blink (S12A). Then, the setting operator drags and drops the icon of communication address "3" onto icon (temp 2) that corresponds to the lighting device which is caused to blink, as illustrated in FIG. 10A. In this manner, icon (temp 2) and communication address "3" are associated with each other.

Furthermore, for the other communication address "7", the setting operator drags and drops the icon of communication address "7" onto icon (temp 1) in the same manner as above, after checking blinking of the lighting device. In this manner, icon (temp 1) and communication address "7" are associated with each other (S13A).

When the associating of the redundantly received communication addresses is ended, the setting operator presses a button of "restart automatic association" displayed in correction input section 21d. Then, the automatic association is restarted for the rest of lighting devices, 10c to 10h. It should be noted that, since icon (temp 2) has already been associated with a communication address, even when an optical ID is received under lighting device 10b corresponding to icon (temp 2), it is also possible to configure the settings to ignore the received optical ID.

In addition, although the communication addresses are displayed in the predetermined region on screen 21 according to the foregoing embodiment, only an icon without a communication address displayed (hereinafter referred to as a candidate icon) may be displayed, and association processes may be performed using the candidate icon.

(2.2 Advantageous Effects, Etc.)

A communication address setting method according to the present embodiment further includes: in the obtaining of the communication address in the set order, when two or more of the communication addresses are obtained from two or more of the plurality of lighting devices, displaying two or more candidate icons which correspond one-to-one to the obtained two or more of the communication addresses, in a predetermined region (correction input section 21d) of screen 21; and activating one of the two or more of the plurality of lighting devices which correspond to one of the two or more candidate icons displayed in the predetermined region, associating, when receiving an input confirming a position of the activated one of the two or more of the plurality of lighting devices (for example, a position of lighting device 10b), a communication address of one of the plurality of lighting devices which corresponds to the one of the two or more candidate icons displayed in the predetermined region, which corresponds to the activated one of the two or more of the plurality of lighting devices, with an icon (for example, icon (Temp 2)) which corresponds to the positions of the activated one of the two or more of the plurality of lighting devices (for example, lighting device 10b), and displaying the state of the associating on the screen.

In this manner, even when communication addresses are redundantly obtained, it is possible to easily correct the association between each of the icons and a corresponding one of the communication addresses, making it possible to easily set the communication addresses.

In addition, wherein when the two or more candidate icons are displayed in the predetermined region, each of the two or more candidate icons may be displayed including a communication address (for example, communication address "3" or "7") of a corresponding one of the two or more of the plurality of lighting devices.

Embodiment 3

Embodiment 3 describes the case where the order in which a plurality of lighting devices 10a to 10h are activated does not match the order determined in the process of S3. Lighting system 100, lighting devices 10a to 10h, operation terminal 20, and management device 30 each has a configuration identical to the configuration according to Embodiment 1.

(3.1. Communication Address Setting Method)

Figure 11A:
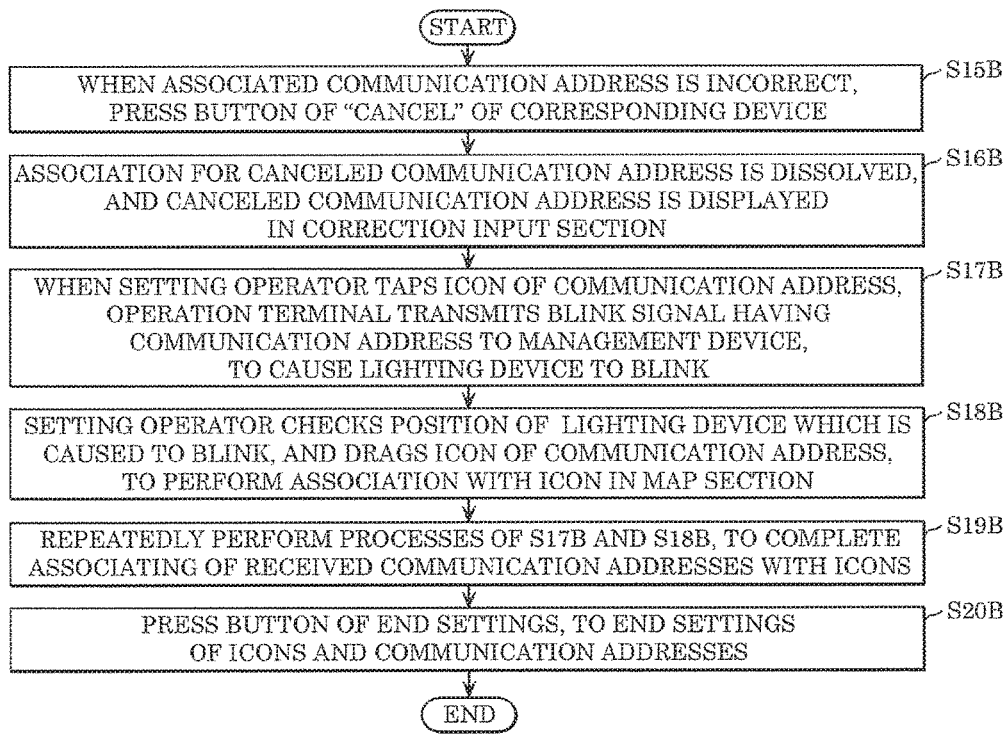
FIG. 11A is a flowchart for correcting an error of a communication address according to Embodiment 3.
Figure 12A:
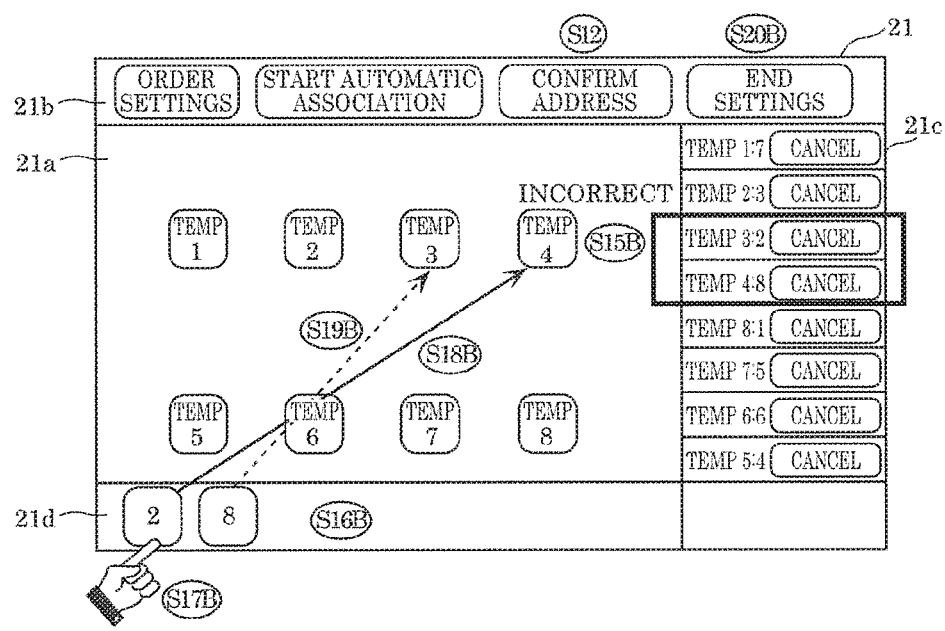
FIG. 12A is a diagram which illustrates a screen of the operation terminal during correcting an error of a communication address according to Embodiment 3.
Figure 12B:
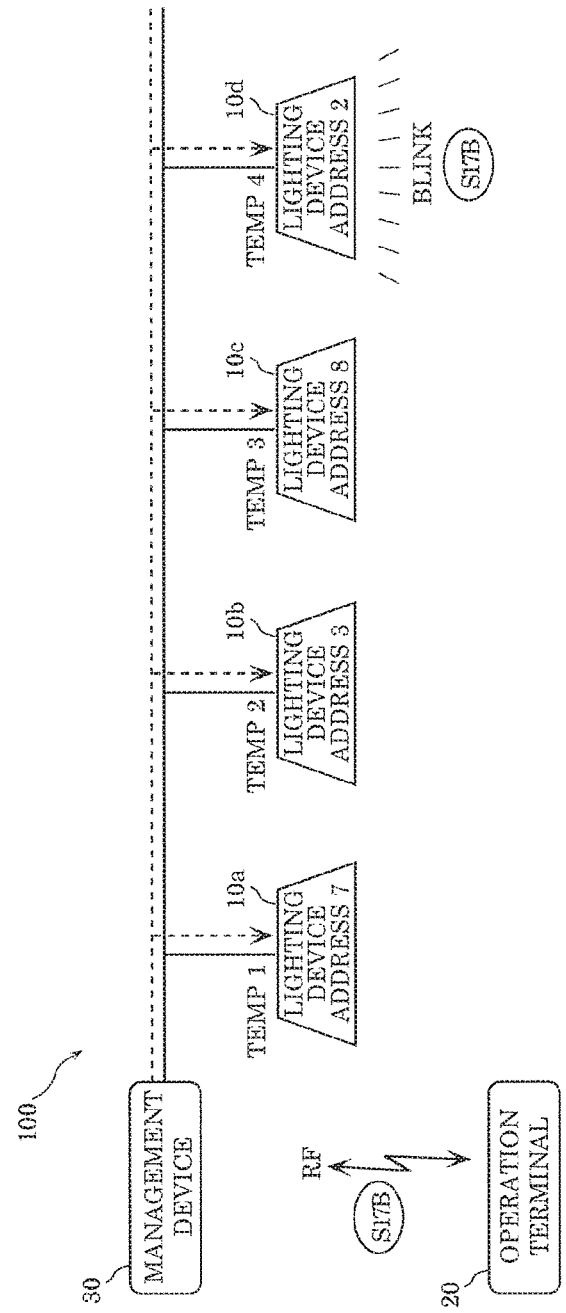
FIG. 12B is a diagram which illustrates a lighting system during correcting an error of a communication addresses according to Embodiment 3.

FIG. 11A is a flowchart for correcting an error of a communication address. FIG. 11B is a process sheet for correcting an error of a communication address. FIG. 12A is a diagram which illustrates screen 21 of operation terminal 20 during correcting an error of a communication address. FIG. 12B is a diagram which illustrates lighting system 100 during correcting an error of a communication address.

First, an setting operator presses a button of "confirm address" on operation input section 21b (S12), to cause a plurality of lighting devices 10a to 10h to emit light at a 100% lighting level in the order of obtaining communication addresses (S13). At this time, there is no problem when the lighting devices emit light at a 100% lighting level in the set order. However, when skipping or returning occurs in the order, it is determined that the association includes an error.

For example, as illustrated in FIG. 12A, when communication addresses "2" and "8" associated with (temp 3) and (temp 4) are inverted, the order in which lighting devices 10c and 10d emit light differs from the set order.

In this case, the setting operator determines that the associated communication addresses are incorrect, and presses the button of "cancel" corresponding to communication addresses "2" and "8" (S15B).

In this manner, the association for the canceled communication addresses "2" and "8" is dissolved, and the canceled communication addresses "2" and "8" are displayed in a predetermined region on screen 21 (S16B). More specifically, the incorrectly associated communication addresses "2" and "8" are each displayed as an icon on correction input section 21d of screen 21.

Next, the setting operator taps the icon of one of the communication addresses "2" to activate a lighting device having this communication address. More specifically, a blink signal is transmitted from operation terminal 20 via management device 30 to a lighting device corresponding to communication address "2", thereby causing the lighting device to blink (S17B, see FIG. 12B).

The setting operator is allowed to check which one of the icons on screen 21 corresponds to the lighting device which is caused to blink, according to the installation position of the lighting device which is caused to blink. Then, the setting operator drags and drops the icon of communication address "2" onto icon (temp 4) that corresponds to the lighting device which is caused to blink. In this manner, icon (temp 4) and communication address "2" are associated with each other (S18B).

Furthermore, for the other communication address "8", the setting operator drags and drops the icon of communication address "8" onto icon (temp 3) in the same manner as above, after checking blinking of the lighting device. In this manner, icon (temp 3) and communication address "8" are associated with each other (S19B).

When the associating of the incorrectly received communication addresses is ended, the setting operator presses a button of "end settings" displayed in operation input section 21b. With this operation, the association between the incorrectly associated icon and communication address is corrected and determined (S20B).

(3.2. Advantageous Effects, Etc.)

A communication address setting method according to the present embodiment further includes: activating the plurality of lighting devices 10a to 10h in the order of the obtaining of the communication addresses, and displaying, when receiving an input indicating that an order of the activating of the plurality of lighting devices 10a to 10h is mismatched with the set order of the plurality of icons, a mismatched one of the communication addresses (for example, a communication address "2" or "8"), in a predetermined region (correction input section 21d) of screen 21; and activating one of the plurality of lighting devices which has the mismatched one of the communication addresses (for example, a communication address "2") displayed in the predetermined region, associating, by receiving an input confirming a position of the activated one of the plurality of lighting devices (for example, a position of lighting device 10d), the mismatched one of the communication addresses displayed in the predetermined region with one of the plurality of icons (for example, icon "Temp 4") which corresponds to the position of the activated one of the plurality of lighting devices (for example, lighting device 10d), and displaying the state of the associating on screen 21.

In this manner, even when a communication address is incorrectly obtained, it is possible to easily correct the association between an icon and the communication address, making it possible to easily set the communication addresses.

It should be noted that, although the communication addresses are displayed in the predetermined region on screen 21 according to the foregoing embodiment, only an icon without a communication address displayed (candidate icon) may be displayed, and association processes may be performed using the candidate icon.

That is, a communication address setting method according to the present embodiment may further include activating the plurality of lighting devices 10a to 10h in the order of the obtaining of the communication addresses, and displaying, when receiving an input indicating that an order of the activating of the plurality of lighting devices 10a to 10h is mismatched with the set order of the plurality of icons, a candidate icon indicating one of the plurality of lighting devices which has a mismatched one of the communication addresses, in a predetermined region (correction input section 21d) of the screen; and activating the one of the plurality of lighting devices which corresponds to the candidate icon displayed in the predetermined region, associating, by receiving an input confirming a position of the activated one of the plurality of lighting devices (for example, a position of lighting device 10d), a communication address of the one of the plurality of lighting devices which corresponds to the candidate icon with one of the plurality of icons (for example, icon (Temp 4)) which corresponds to the position of the activated one of the plurality of lighting devices, and displaying the state of the associating on the screen.

Other Embodiments

Although the communication address setting method, operation terminal 20, and lighting system 100 have been described based on the above-described embodiments, the present disclosure is not limited to the above-described embodiments. For example, embodiments obtained through various modifications to the respective embodiments which may be conceived by a person skilled in the art as well as embodiments realized by arbitrarily combining the structural components and functions of the respective embodiments without materially departing from the spirit of the present disclosure are included in the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A communication address setting method for setting, in an operation terminal, communication addresses of a plurality of lighting devices installed in a building, the communication address setting method comprising:
displaying a plurality of icons and a plurality of command buttons on a screen of the operation terminal, the plurality of icons corresponding to a positional relationship of the plurality of lighting devices installed in the building, and the plurality of command buttons including an order setting button, an automatic association button and a restarting automatic association button;
receiving, in response to the order setting button being activated, an order for associating the plurality of icons with the communication addresses,
after the plurality of icons are displayed in a set order on the screen, sequentially obtaining, in response to the automatic association button being activated, communication addresses of the plurality of lighting devices respectively from the plurality of lighting devices by receiving, by a light receiver included in the operation terminal, information including an communication address received via visible light communication and superimposed on illumination light, directly under each of the plurality of lighting devices; and
associating, in the order received, the plurality of icons, in a one-to-one relationship, with the communication addresses sequentially obtained, and displaying a state of the associating on the screen, wherein:
the associating of the plurality of icons with the communication addresses, and the displaying of the state of the associating on the screen are performed by:
in the sequentially obtaining of the communication address, when two or more of the communication addresses are concurrently obtained via the visible light communication from two or more of the plurality of lighting devices, displaying two or more candidate icons which correspond one-to-one to the obtained two or more of the communication addresses, in a predetermined region of the screen;
activating one of the two or more of the plurality of lighting devices which corresponds to one of the two or more candidate icons displayed in the predetermined region, associating, when receiving an input confirming a position of the activated one of the two or more of the plurality of lighting devices, a communication address of one of the plurality of lighting devices which corresponds to the one of the two or more candidate icons displayed in the predetermined region, which corresponds to the activated one of the two or more of the plurality of lighting devices, with an icon which corresponds to the position of the activated one of the two or more of the plurality of lighting devices;
restarting, in response to the restarting automatic association button being activated, the associating of the plurality of icons; and
displaying the state of the associating on the screen.

2. The communication address setting method according to claim 1,
wherein when the two or more candidate icons are displayed in the predetermined region, each of the two or more candidate icons is displayed including a communication address of a corresponding one of the two or more of the plurality of lighting devices.

3. The communication address setting method according to claim 1,
wherein the plurality of lighting devices transmit optical identifiers (IDs) including the respective communication addresses, and
the operation terminal obtains the communication addresses by receiving the optical IDs respectively from the plurality of lighting devices.

4. The communication address setting method according to claim 3,
wherein the operation terminal obtains the communication addresses by being moved according to positions of the plurality of lighting devices in the set order, and receiving the optical IDs corresponding one-to-one to the plurality of lighting devices.

5. The communication address setting method according to claim 1,
wherein the communication addresses of the plurality of lighting devices are set in a management device which controls activation of the plurality of lighting devices, by transmitting, to the management device, information in which the plurality of icons and the obtained communication addresses are associated with one another.

6. An operation terminal for setting communication addresses of a plurality of lighting devices installed in a building, the operation terminal comprising:
a display input portion which displays a plurality of command buttons and a plurality of icons corresponding to a positional relationship of the plurality of lighting devices installed in the building, the plurality of command buttons including an order setting button, an automatic association button and a restarting automatic association button; and a controller which causes the display input portion to display the communication addresses of the plurality of lighting devices, receives, response to the order setting button being activated, an order for associating the plurality of icons with the communication addresses, after the plurality of icons are displayed in a set order on the display input portion, sequentially obtains, in response to the automatic association button being activated, the communication addresses of the plurality of lighting devices respectively from the plurality of lighting devices, by receiving, by a light receiver included in the operation terminal, information including an communication address received via visible light communication and superimposed on illumination light, directly under each of the plurality of lighting devices, associates, in the order received, the plurality of icons, in a one-to-one relationship, with the communication addresses sequentially obtained, and causes the display input portion to display a state of the associating, wherein the controller associates the plurality of icons with the communication addresses, and causes the display input portion to display the state of the associating, by:

in the sequentially obtaining of the communication address, when two or more of the communication addresses are concurrently obtained via the visible light communication from two or more of the plurality of lighting devices, displaying two or more candidate icons which correspond one-to-one to the obtained two or more of the communication addresses, in a predetermined region of the display input portion; and activating one of the two or more of the plurality of lighting devices which corresponds to one of the two or more candidate icons displayed in the predetermined region, associating, when receiving an input confirming a position of the activated one of the two or more of the plurality of lighting devices, a communication address of one of the plurality of lighting devices which corresponds to the one of the two or more candidate icons displayed in the predetermined region, which corresponds to the activated one of the two or more of the plurality of lighting devices, with an icon which corresponds to the position of the activated one of the two or more of the plurality of lighting devices;

restarting, in response to the restarting automatic association button being activated, the associating of the plurality of icons; and displaying the state of the associating on the display input portion.

7. A lighting system comprising a plurality of lighting devices, a management device which controls activation of the plurality of lighting devices installed in a building, and an operation terminal which communicates with the management device, wherein the plurality of lighting devices respectively include light sources which transmit optical identifiers (IDs) including respective communication addresses, the operation terminal includes:

a display input portion which displays a plurality of command buttons and a plurality of icons corresponding to a positional relationship of the plurality of lighting devices installed in the building, the plurality of command buttons including an order setting button, an automatic association button and a restarting automatic association button;

a light receiver which receives the optical IDs; and a controller which causes the display input portion to display the communication addresses included in the optical IDs received by the light receiver, the display input portion receives, in response to the order setting button being activated, an order for associating the plurality of icons with the communication addresses, and displays the plurality of icons in a set order, the light receiver receives the optical IDs respectively from the plurality of lighting devices in the set order, directly under each of the plurality of lighting devices, the controller, in response to the automatic association button being activated, sequentially obtains the communication addresses of the plurality of lighting devices from the respective optical IDs received by the light receiver, associates, in the order received, the plurality of icons, in a one-to-one relationship, with the communication addresses sequentially obtained, displays the plurality of icons and the communication addresses associated in the one-to-one relationship in the display input portion, and transmits information of the associating to the management device, and the controller associates the plurality of icons with the communication addresses, displays the plurality of icons and the communication addresses in the display input portion, and transmits the information of the associating to the management device, by:

in the sequentially obtaining of the communication address, when the light receiver receives, by receiving the optical IDs, two or more of the communication addresses concurrently from two or more of the plurality of lighting devices, displaying two or more candidate icons which correspond one-to-one to the obtained two or more of the communication addresses, in a predetermined region of the display input portion; and activating one of the two or more of the plurality of lighting devices which corresponds to one of the two or more candidate icons displayed in the predetermined region, associating, when receiving an input confirming a position of the activated one of the two or more of the plurality of lighting devices, a communication address of one of the plurality of lighting devices which corresponds to the one of the two or more candidate icons displayed in the predetermined region, which corresponds to the activated one of the two or more of the plurality of lighting devices, with an icon which corresponds to the position of the activated one of the two or more of the plurality of lighting devices, restarting, in response to the restarting automatic association button being activated, the associating of the plurality of icons;

displaying a state of the associating in the display input portion; and transmitting the information of the associating to the management device.

* * * * *